INVENTOR:
HAROLD McCAIN

ATTORNEY

United States Patent Office 3,332,221
Patented July 25, 1967

3,332,221
ROTARY MOWER ATTACHMENT
Harold McCain, Lincoln, Mo. 65338
Filed Sept. 10, 1964, Ser. No. 395,370
1 Claim. (Cl. 56—295)

This invention relates to an attachment for rotary lawn mowers.

Rotary lawn mowers, in which blades, driven by a vertical shaft, rotate in a substantially horizontal plane within a housing, are probably the most common form of power mower for home use. They are most frequently driven by an internal combustion engine, but may also be driven by an electric motor. In either case, the power unit is ordinarily mounted on top of an open bottomed housing.

In cultivating lawns, it is frequently necessary or desirable to apply herbicide, insecticide or fertilizer to selected, relatively restricted areas.

One of the objects of this invention is to provide an attachment for rotary mowers by which herbicide, insecticide or fertilizer or the like may be selectively dispensed over a limited area.

Another object is to provide such a device which is adapted to use with existing rotary mowers.

Still another object is to provide such a device which is simple to install and to use, easy to clean and to maintain, and inexpensive.

Other objects will become apparent to those skilled in the art in the light of the following description and accompanying drawings.

In accordance with this invention, generally stated, an attachment for a rotary mower is provided which includes a distributor mounted on a blade-driving shaft within the compass of a mower housing and between the housing and a blade, a distributor supply spout extending through the housing and into an annular opening in the top of the distributor, and a tank connected to the spout. The distributor includes a hollow annulus, adapted to receive fluent material to be dispensed, and a slinger plate which, in the preferred embodiment, serves the triple function of mounting means for mounting the distributor on the blade-driving shaft, of a closure for the bottom of the annulus, and of a means for dispensing and directing the fluent material from the annulus.

The outer wall of the annulus is so shaped as to direct the fluent material from the spout to distributing ports in the slinger plate.

In the preferred embodiment, the fluent material-containing tank is mounted on the handle of the mower, and is connected to the spout by means of a flexible conduit. A valve is provided between the tank and a coupling on the conduit, so that that tank can be shut off by the valve and removed from the conduit and from the handle without spilling any contents of the tank which may not have been used.

Figure 1:
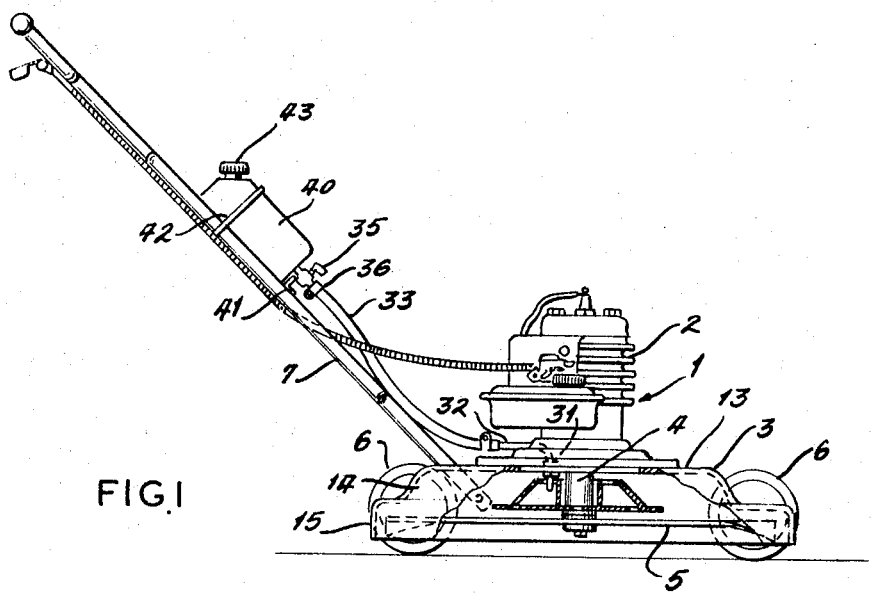
FIGURE 1 is a view in side elevation, partly broken away and partly in section, showing a rotary mower equipped with one illustrative embodiment of attachment of this invention.
Figure 2:
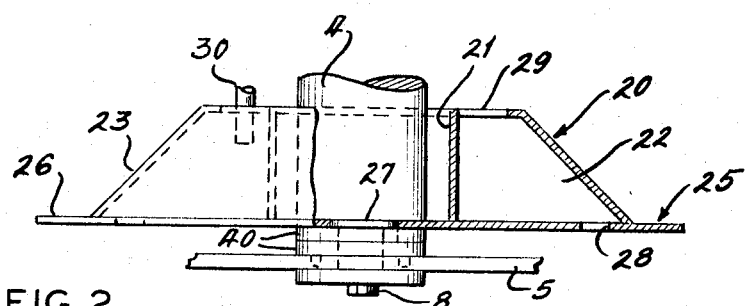
FIGURE 2 is an enlarged fragmentary detail view, partly in section, showing the distributor of the attachment shown in FIGURE 1, and a portion of the spout.
Figure 3:
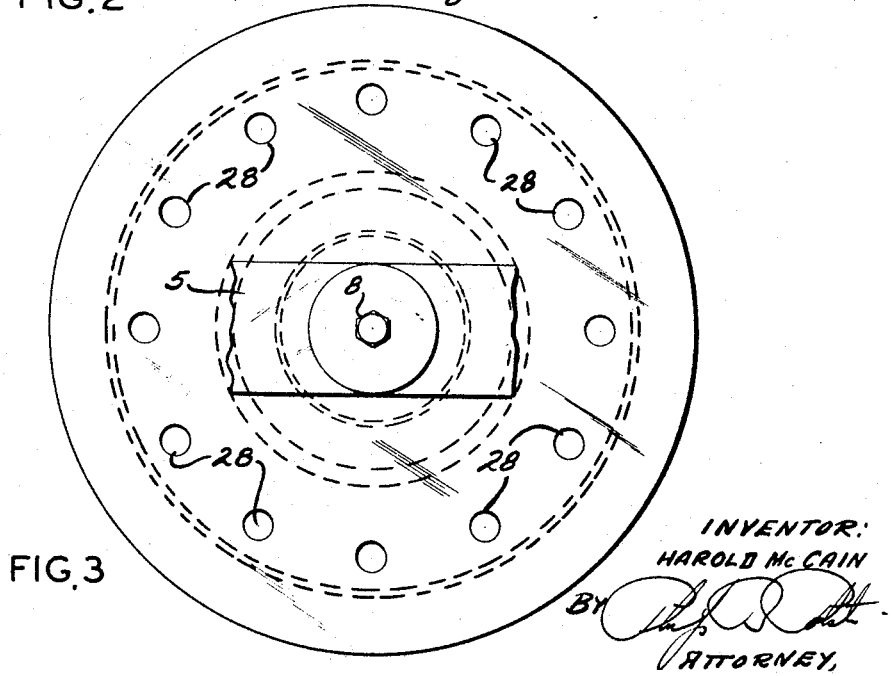
FIGURE 3 is a fragmentary bottom plan view of the distributor shown in FIGURE 2.

Referring now to the drawing for an illustrative embodiment of attachment of this invention, reference numeral 1 indicates a rotary mower upon which the attachment is mounted. The rotary mower 1 includes an internal combustion engine 2, a housing 3, a drive shaft 4, a blade 5, wheels 6, and a handle 7, hingedly mounted on the housing 3.

The housing 3 has a flat top 13, a domed body section 14, and a skirt 15.

The drive shaft 4 projects downwardly from the internal combustion engine 2, through the top of the housing 3, through the height of the domed body portion 14 of the housing, to the part of the housing embarced by the skirt 15, within the compass of which the blade 5 rotates. The drive shaft 4 is reduced at its lower end to define a shoulder, and has an axially extending tapped center hole in its lower end, to receive a retaining stud 8.

In the embodiment of this invention shown, a distributor 20 is mounted on the drive shaft, for rotation therewith, between the blade 5 and the undeside of the top 13 of the housing 3. There is adequate space in conventional mowers between the skirt section 15 and the top, that is, within the domed body portion, to accommodate the distributor 20.

The distributor 20 consists of a hub section 21, forming an inner wall of an open topped hollow annulus 22; a downwardly outwardly flaring ring 23, radially spaced from the hub 21 and concentric therewith, which forms the outer wall of the annulus 22; and a slinger plate 25, which is concentric with the hub and ring. The hub 21 and ring 23 are welded or otherwise secured fluid tight at their bottom edges to the top surface of the plate, so that a portion of the plate forms the bottom of the annulus 22. The hub 21 is of a diameter to admit the drive shaft 4.

The slinger plate 25 is a flat disk of a diameter greater than that of the ring 23, so as to provide a radially projecting flange 26 outboard of the ring 23. The plate 25 has a central, shaft-receiving hole 27. Between the hole 27 and the hub 21, the plate 25 provides a clamping area, which is clamped between a shoulder on the shaft 4 near its lower end and washers 40.

The slinger plate 25 is provided with a circle of distributor ports 28, communicating with the interior of the annulus close to the bottom edge of the ring 23.

The upper edges of the hub 21 and ring 23 define between them a circular open mouth 29 into which a spout 30 projects. The lower end of the spout 30 extends well within the hollow annulus 22, and is open. The spout 30 is mounted in a bushing 31 in a hole in the top of the housing 3. In the embodiment shown in FIGURE 1, the spout is integral with a tube 32 which extends rearwardly of the mower, over the top 13 of the housing. A flexible hose 33 is connected at its lower end to the tube 32, and at its upper end, to a fitting on a stop cock type valve 35. A coupling 36 on the hose 33, is of a type which permits ready demounting and remounting on the fitting. The valve 35 is connected to and communicates with the interior of a tank 40, which is mounted on the handle 7 by any suitable means, such as spring clamps, a releasable strap, or a mounting bracket from which it can be easily removed. In the embodiment shown in FIGURE 1, the tank is mounted by means of an angle bracket 41 and a clip 42. The tank 40 is provided with a filler opening, closed with a filler-breather cap 43, through which the tank can be filled with the fluent material to be distributed.

In operation, the tank 40 can be removed and filled with a fluent material to be distributed, as for example, a liquid crab grass killer. The valve 35 is closed. The tank is mounted on the handle, the hose 33 is attached to the fitting of the valve 35, and the mower is ready for use. As the user is cutting the lawn, if he comes to a patch of crab grass, he need only open the valve 35, which permits the liquid to run through the hose 33, through the tube 32, from the spout 30, into the annulus 22. The centrifugal force causes the liquid to move out to the ports 28, from which the liquid is discharged.

The flange 26 tends to direct the liquid away from the domed body portion of the housing. The ports 28 may be angled from the vertical in a slope somewhat the same as the slope of the ring 23.

It has been found that the distributor permits the liquid to be applied, with little diffusion, to the area being traversed while the valve 35 is open. Whenever the dispensing of liquid is to be stopped, the valve 35 need only be closed.

The cant of the blade 5 is such as to tend to blow downwardly, which also aids in the distribution of the fluent material, although, as has been indicated, the outward movement of air, caused by the blade, has been found to produce little dispersion of the fluent material beyond the area covered by the housing. It is believed that one reason for this result is that the distributor ports are made sufficiently large so that the fluent material is not atomized as it emerges.

Merely by way of illustration, and not by way of limitation, a satisfactory distributor for use in a rotary mower for home use can have the following dimensions: slinger plate 25, 9½ inches in diameter; ring 23, 8 inches in outside diameter at the slinger plate, 5 inches at its top arras, 4 7/16 inches at its mouth-defining rim; and hub 21, 2⅞ inches in outside diameter. There can be twelve, equally spaced distributor ports 28, each 3/32 of an inch in diameter. The total height of the distributor can be 1½ inches. The shaft-receiving hole 27 can be ⅝ of an inch in diameter.

The various dimensions can, of course, be varied to accommodate various types and sizes of rotary mowers and to accommodate different fluent materials. Prilled or pelleted solids can even be accommodated if the device is properly designed. Numerous variations in the construction of the device of this invention, within the scope of the appended claim, will occur to those skilled in the art in the light of the foregoing disclosure. Merely by way of illustration of such variations, the hub 21 can be omitted, although it is preferred to retain it; different valving arrangements can be used, such as a long stemmed needle or plunger type valve the stem of which projects above the tank to facilitate ready manipulation, or, for simplicity, a pinch valve on the flexible conduit, and different particular configurations can be given the various parts, such as a polygonal ring forming the outer wall of the annulus, for example.

Having thus described the invention, what is claimed and desired to be secured by Letters Patent is:

An attachment for a rotary mower having a power driven vertical shaft, an open-bottomed housing through which the shaft extends and a blade mountable on said shaft within the compass of said housing, said attachment comprising a distributor mounted on said shaft between the blade and the housing, said distributor comprising a hollow annulus an outside wall of which is constituted by a downwardly outwardly flaring ring, and a slinger plate constituting a bottom for said annulus, said ring being secured fluid tightly to said slinger plate, said slinger plate having distributor ports therethrough within the compass of said ring and communicating with the interior of said annulus closely adjacent the said ring, and an extension of said slinger plate constituting an annular flange projecting radially beyond the periphery of the said ring.

References Cited

UNITED STATES PATENTS

| | | | |
|---|---|---|---|
| 1,692,617 | 11/1928 | Bowen | 239—223 |
| 2,908,444 | 10/1959 | Mullen | 56—25.4 |
| 2,939,636 | 6/1960 | Mullen | 56—25.4 |

FOREIGN PATENTS

| | | |
|---|---|---|
| 625,488 | 8/1961 | Canada. |
| 134,298 | 10/1929 | Switzerland. |

ABRAHAM G. STONE, *Primary Examiner.*

ANTONIO F. GUIDA, *Examiner.*